US012647966B2

(12) United States Patent
Wang et al.

(10) Patent No.: US 12,647,966 B2
(45) Date of Patent: Jun. 2, 2026

---

(54) UE WITH BACKSCATTERING RADIO

(71) Applicant: QUALCOMM Incorporated, San Diego, CA (US)

(72) Inventors: Xiaojie Wang, Hillsborough, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 437 days.

(21) Appl. No.: 17/664,624

(22) Filed: May 23, 2022

(65) Prior Publication Data

US 2023/0379901 A1 Nov. 23, 2023

(51) Int. Cl.
| | |
|---|---|
| *H04W 72/12* | (2023.01) |
| *H04B 5/45* | (2024.01) |
| *H04W 52/02* | (2009.01) |
| *H04W 74/0816* | (2024.01) |
| *H04W 88/06* | (2009.01) |

(52) U.S. Cl.
CPC .......... *H04W 72/1215* (2013.01); *H04B 5/45* (2024.01); *H04W 52/0216* (2013.01); *H04W 74/0816* (2013.01); *H04W 88/06* (2013.01)

(58) Field of Classification Search
CPC ......... H04W 72/1215; H04W 52/0216; H04W 74/0816; H04W 88/06; H04B 5/72; Y02D 30/70; H02J 13/0002; H02J 13/00022
See application file for complete search history.

(56) References Cited

U.S. PATENT DOCUMENTS

2018/0084465 A1* 3/2018 Jung ..................... H04W 8/005

2020/0178171 A1* 6/2020 Lou ................... H04W 52/0216
2021/0368439 A1* 11/2021 Karimaruthumkal ...................... H04L 5/0055

FOREIGN PATENT DOCUMENTS

WO 2021163971 A1 8/2021

OTHER PUBLICATIONS

Boyer C., et al., "Invited Paper—Backscatter Communication and RFID: Coding, Energy, and Mimo", IEEE Transactions on Communications, Piscataway, NJ. USA, vol. 62, No. 3, Mar. 1, 2014, pp. 770-785, XP011543978, ISSN: 0090-6778, Doi: 10.1109/TCOMM. 2013.120713.130417, [retrieved on Mar. 25, 2014], Abstract, Section 1.

CATT: "UE Wakeup Mechanism and On-Demand Access for fNB-IoT UE Power Saving", 3GPP TSG RAN WG1 Meeting #89, R1-1707456, 3GPP tsg_ran\WG1_RL1, Hangzhou, China, May 15-19, 2017, May 6, 2017, pp. 1-4, the whole document.

Huawei, et al., "Passive IoT for 5G Advanced", 3GPP TSG RAN Rel-18 Workshop, RWS-210453, Electronic Meeting, Jun. 28-Jul. 2, 2021, 5 Pages, The Whole Document.

International Search Report and Written Opinion—PCT/US2023/021599—ISA/EPO—Aug. 11, 2023.

(Continued)

*Primary Examiner* — Dady Chery
(74) *Attorney, Agent, or Firm* — Procopio, Cory, Hargreaves & Savitch

(57) ABSTRACT

Apparatus, methods, and computer program products for backscatter communication (BC) are included. An example method may include transmitting an indication of a backscattering radio (BR) capability to a network entity. The example method may also include receiving a first message from the network entity, the first message indicating that the UE is to remain on a main radio (MR) state or transition to a BR state.

29 Claims, 14 Drawing Sheets

(56)  References Cited

OTHER PUBLICATIONS

VIVO., et al., "Motivation for New Study Item on Ultra-low Power Wake up Signal in Rel-18", 3GPP TSG RAN Rel-18 Workshop, RWS-210168, 3rd Generation Partnership Project (3GPP), Mobile Competence Centre, 650, Route Des Lucioles, F-06921, Sophia-Antipolis Cedex, France, vol. TSG RAN, No. Electronic Meeting, Jun. 28, 2021-Jul. 2, 2021, Jun. 7, 2021, 14 Pages, XP052025727, Slide 4.

* cited by examiner

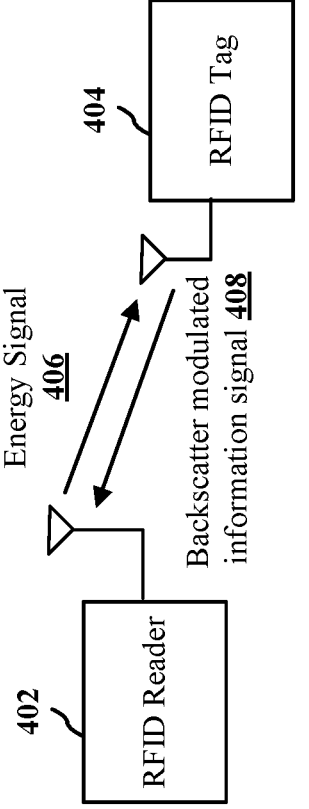
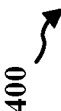
FIG. 4

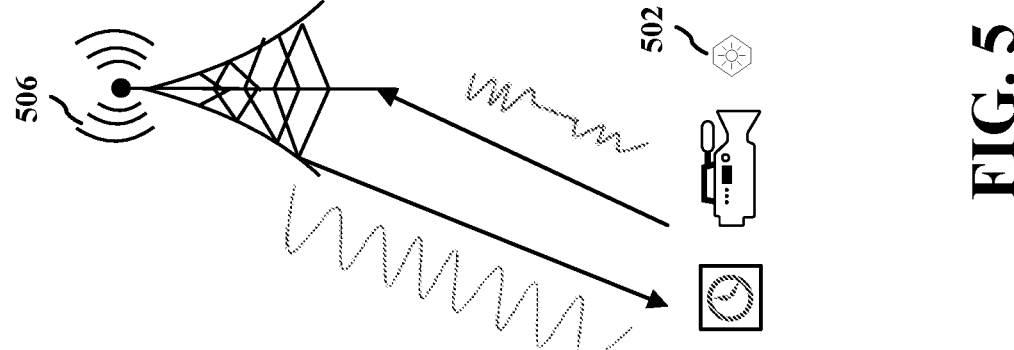
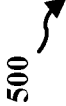
FIG. 5

Main Radio 606

LP-WUR 604

654

664

652

662

MR

LP-WUR

600

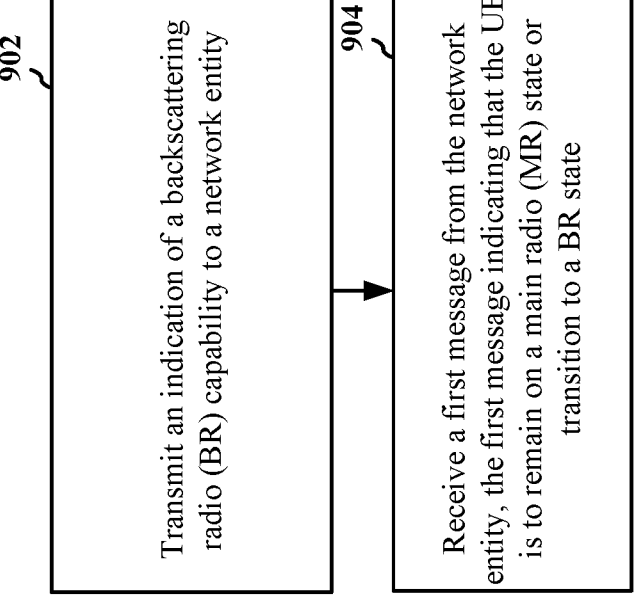
902
Transmit an indication of a backscattering radio (BR) capability to a network entity
904
Receive a first message from the network entity, the first message indicating that the UE is to remain on a main radio (MR) state or transition to a BR state
900
FIG. 9

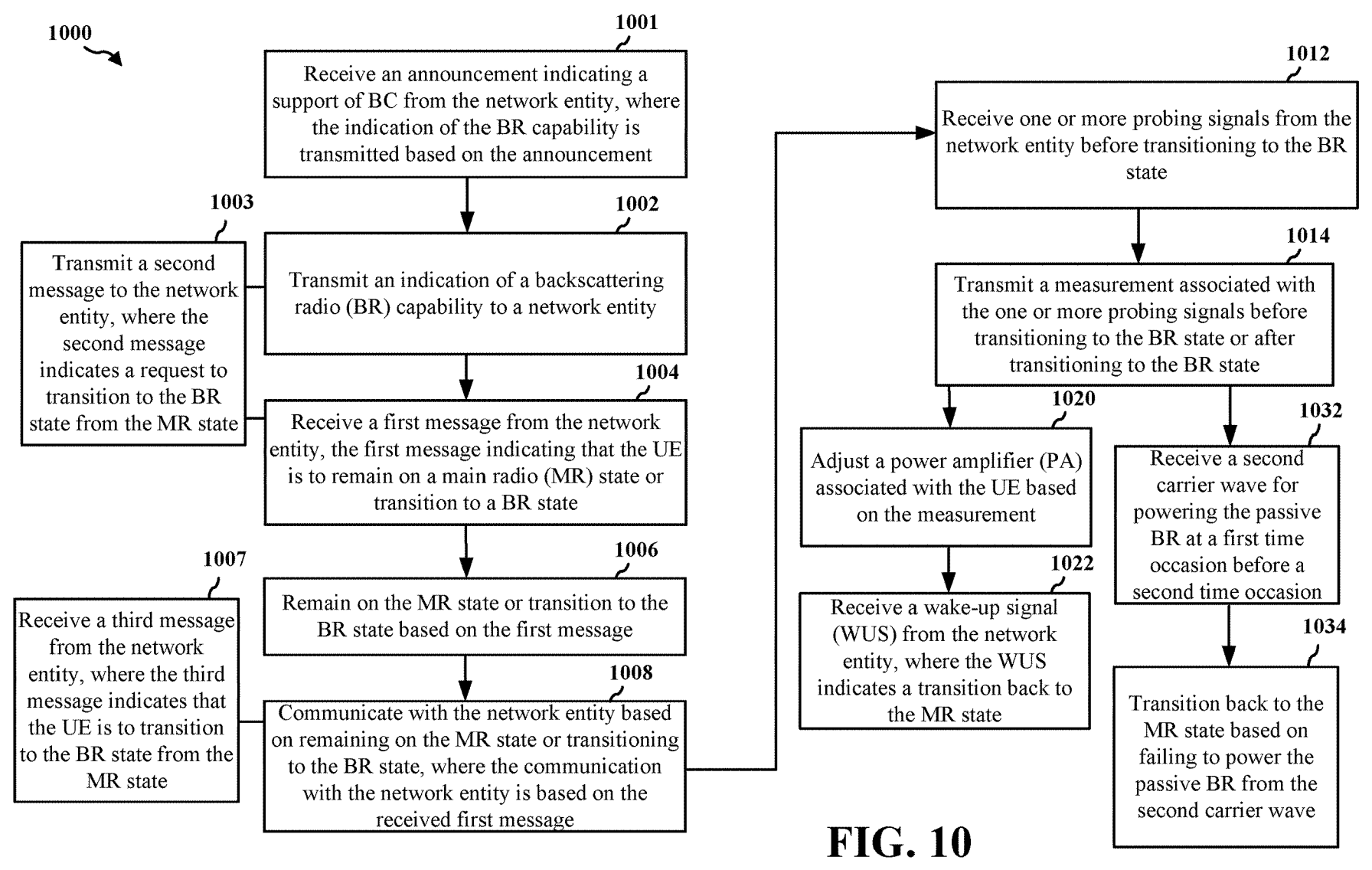

1000

1001 Receive an announcement indicating a support of BC from the network entity, where the indication of the BR capability is transmitted based on the announcement 1002 Transmit an indication of a backscattering radio (BR) capability to a network entity 1003 Transmit a second message to the network entity, where the second message indicates a request to transition to the BR state from the MR state 1004 Receive a first message from the network entity, the first message indicating that the UE is to remain on a main radio (MR) state or transition to a BR state 1006 Remain on the MR state or transition to the BR state based on the first message 1007 Receive a third message from the network entity, where the third message indicates that the UE is to transition to the BR state from the MR state 1008 Communicate with the network entity based on remaining on the MR state or transitioning to the BR state, where the communication with the network entity is based on the received first message 1012 Receive one or more probing signals from the network entity before transitioning to the BR state 1014 Transmit a measurement associated with the one or more probing signals before transitioning to the BR state or after transitioning to the BR state 1020 Adjust a power amplifier (PA) associated with the UE based on the measurement 1022 Receive a wake-up signal (WUS) from the network entity, where the WUS indicates a transition back to the MR state 1032 Receive a second carrier wave for powering the passive BR at a first time occasion before a second time occasion 1034 Transition back to the MR state based on failing to power the passive BR from the second carrier wave

FIG. 10

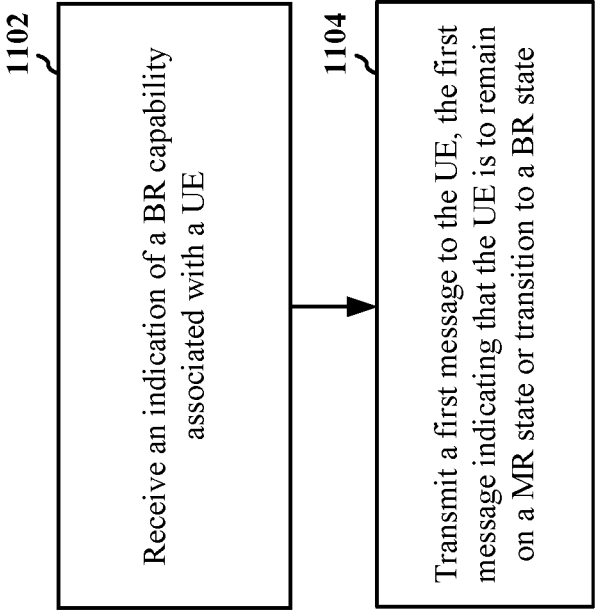
1102
Receive an indication of a BR capability associated with a UE
1104
Transmit a first message to the UE, the first message indicating that the UE is to remain on a MR state or transition to a BR state
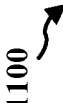
1100
FIG. 11

UE WITH BACKSCATTERING RADIO

TECHNICAL FIELD

The present disclosure relates generally to communication systems, and more particularly, to wireless communication systems with backscattering radio (BR).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to transmit an indication of a backscattering radio (BR) capability to a network entity. The memory and the at least one processor coupled to the memory may be further configured to receive a first message from the network entity, the first message indicating that the UE is to remain on a main radio (MR) state or transition to a BR state.

In another aspect of the disclosure, a method, a computer-readable medium, and an apparatus at a network entity are provided. The apparatus may include a memory and at least one processor coupled to the memory. The memory and the at least one processor coupled to the memory may be configured to receive an indication of a backscattering radio (BR) capability associated with a user equipment (UE). The memory and the at least one processor coupled to the memory may be further configured to transmit a first message to the UE, the first message indicating that the UE is to remain on a main radio (MR) state or transition to a BR state.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 4 is a diagram illustrating example radio frequency identification (RFID).

FIG. 5 is a diagram illustrating example passive devices in communication with a network entity.

FIG. 9 is a flowchart of a method of wireless communication.

FIG. 10 is a flowchart of a method of wireless communication.

FIG. 11 is a flowchart of a method of wireless communication.

DETAILED DESCRIPTION

Figure 1:
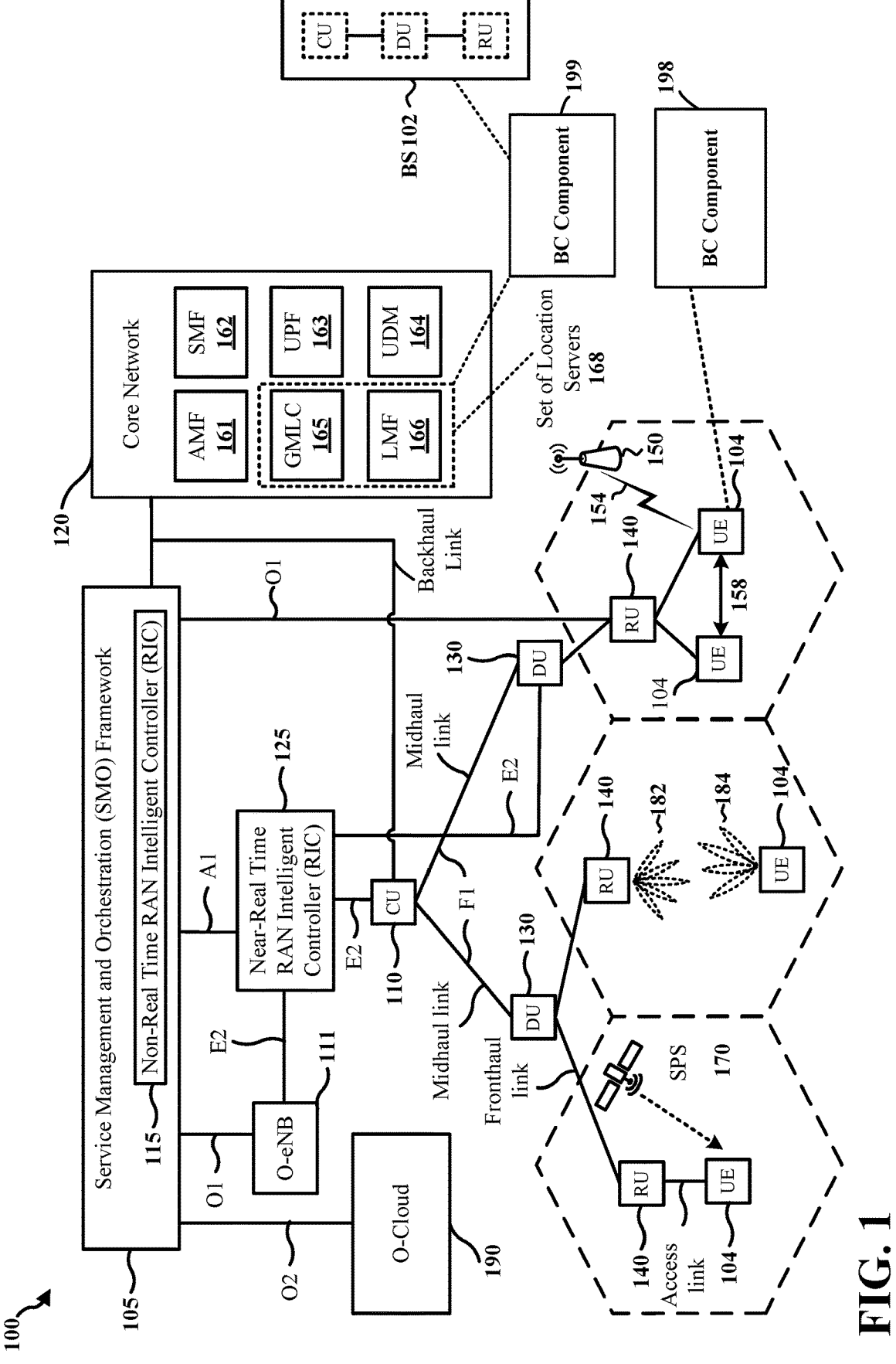
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include a BC component 198. In some aspects, the BC component 198 may be configured to transmit an indication of a backscattering radio (BR) capability to a network entity. In some aspects, the BC component 198 may be further configured to receive a first message from the network entity, the first message indicating that the UE is to remain on a main radio (MR) state or transition to a BR state.

In certain aspects, the base station 102 may include a BC component 199. In some aspects, the BC component 199 may be configured to receive an indication of a BR capability associated with a UE. In some aspects, the BC component 199 may be further configured to transmit a first message to the UE, the first message indicating that the UE is to remain on a MR state or transition to a BR state.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote unit (RU), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figures 2A, 2B, 2C, 2D:
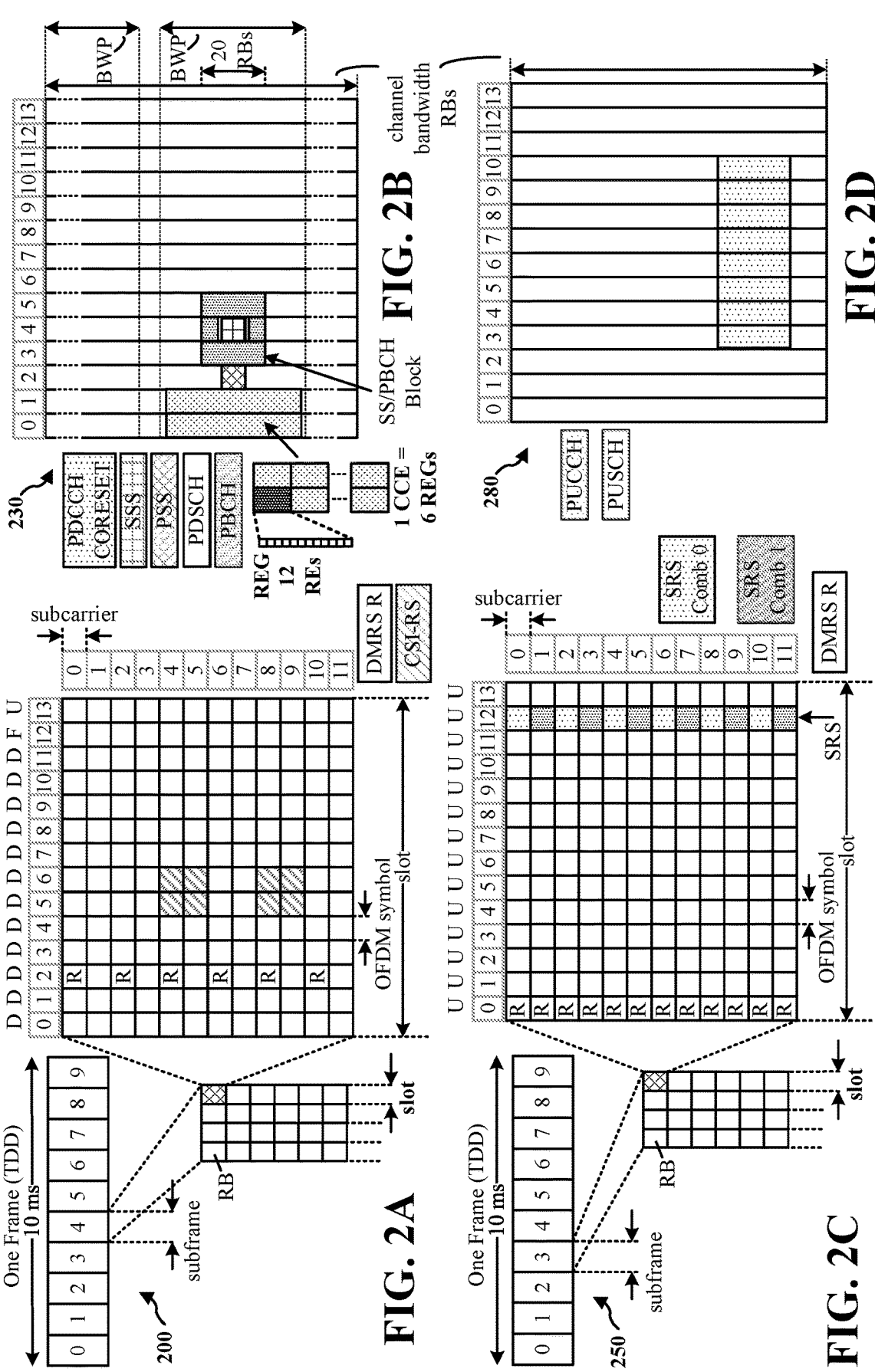
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI).

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^{\mu} \cdot 15[\text{kHz}]$ | Cyclic<br>prefix |
|---|---|---|
| 0 | 15 | Normal |
| 1 | 30 | Normal |
| 2 | 60 | Normal,<br>Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
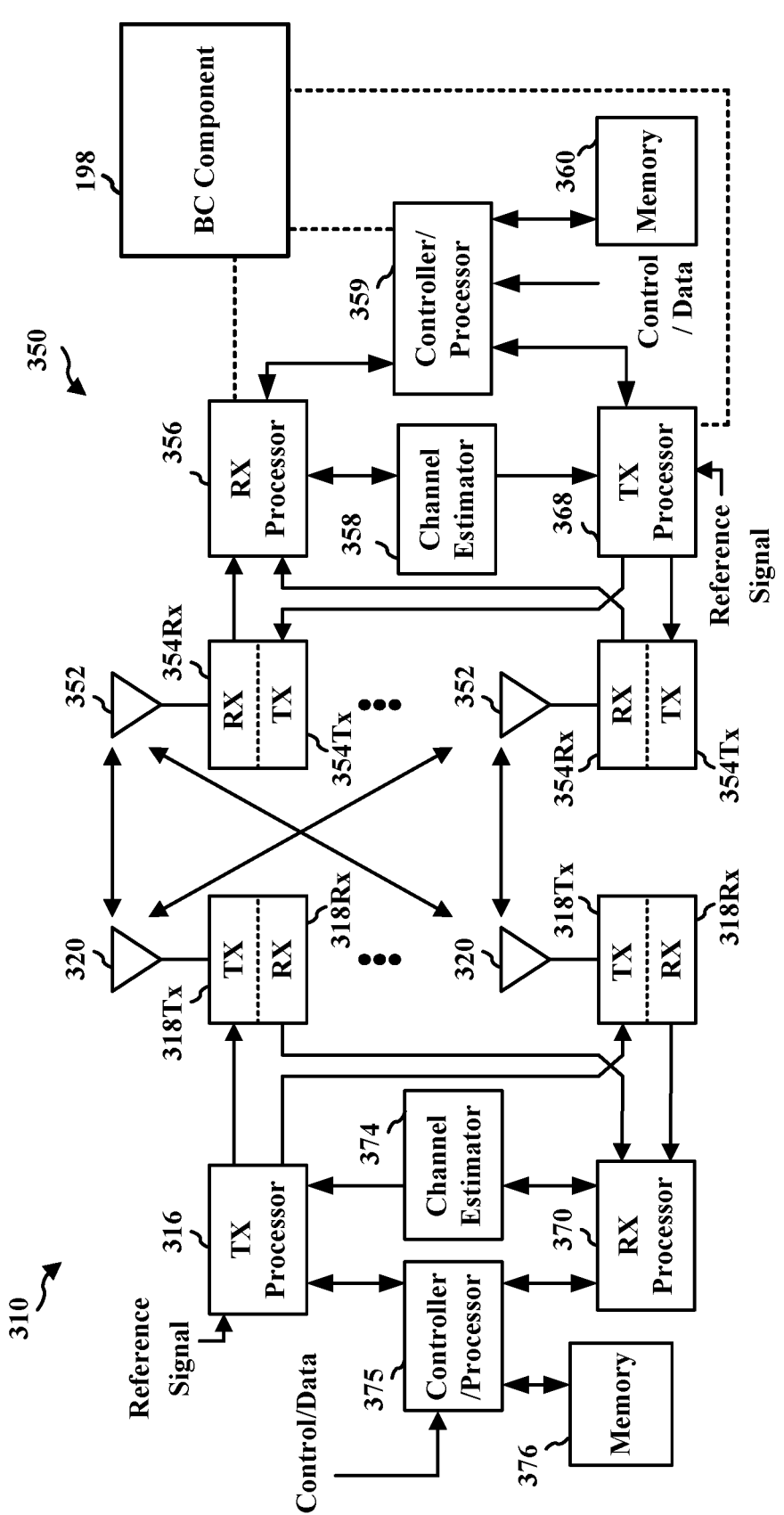
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with BC component 198 of FIG. 1.

At least one of the TX processor 316, the RX processor 370, and the controller/processor 375 may be configured to perform aspects in connection with BC component 199 of FIG. 1.

In addition to higher capability devices, wireless communication may support reduced capability (RedCap) devices. Among others, examples of higher capability devices include premium smartphones, V2X devices, URLLC devices, eMBB devices, etc. Among other examples, reduced capability devices may include wearables (e.g., such as smart watches, augmented reality glasses, virtual reality glasses, health and medical monitoring devices, etc.), industrial wireless sensor networks (IWSN) (e.g., such as pressure sensors, humidity sensors, motion sensors, thermal sensors, accelerometers, actuators, etc.), surveillance cameras, low-end smartphones, etc. For example, NR communication systems may support both higher capability devices and reduced capability devices. A reduced capability device may be referred to as an NR light device, a low-tier device, a lower tier device, etc. Reduced capability UEs may communicate based on various types of wireless communication. For example, smart wearables may transmit or receive communication based on low power wide area (LPWA)/mMTC, relaxed IoT devices may transmit or receive communication based on URLLC, sensors/cameras may transmit or receive communication based on eMBB, etc.

In addition to reduced capability devices, devices with a lower capability than reduced capability devices including lower power consumption and a less complicated structure may be included in wireless communication systems. In some wireless communication systems, passive wireless devices such as zero-power passive IoT wireless devices may be included. Such passive wireless devices may be without active RF components and may perform transmissions based on backscatter communication and may perform reception based on envelope detection or an envelope detector. Backscatter communication may modulate information on an incoming RF signal (which may be a carrier wave that may carry communication between other devices) by an adaptation of antenna load impedance. A passive wireless device may be battery-less or battery assisted. For example, a passive wireless device may operate based on energy harvesting from an incoming radio wave with or without a battery as an additional power source. A passive wireless device may have low power consumption, such as between 1 microwatt to 1000 microwatts. Such passive wireless devices may be devices for inventory management, wireless sensors, or the like. Passive devices may use backscatter communication to communicate with another network entity, such as a base station.

Backscatter communication may enable radio frequency identification (RFID). For example, a reader may send a continuous waveform signal and interrogate commands. An RF tag (which is a passive wireless device) may harvest energy from the continuous waveform signal and may respond to the interrogation by varying its input impedance (e.g., between conjugate match and strongly mismatched), therefore modulating the backscattered signals. RFID is a rapidly growing technology impacting many industries due to its potential for inventory/asset management inside and outside warehouse, IoT, sustainable sensor networks in factories and/or agriculture, and smart home. RFID may include small transponders, which may be referred to as tags, emitting an information-bearing signal upon receiving a signal. RFID may be operated without battery at low operational expenditures (OPEX) and may use small amount of resources. RFID may have use lower amount of maintenance and may have a long life-cycle. FIG. 4 is a diagram 400 illustrating example RFID. As illustrated in FIG. 4, a RFID reader 402 may transmit an energy signal 406 to a passive device, such as a RFID tag 404. The RFID tag 404 may harvest the energy signal 406 over the air and power a transmission/reception circuitry on the RFID tag 404. By harvesting the energy signal 406, the RFID tag 404 may transmit a signal 408 that may be backscatter modulated. In some aspects, semi-passive or active RFID may be used instead of passive RFID.

FIG. 5 is a diagram 500 illustrating example passive devices in communication with a network entity. As illustrated in FIG. 5, in some aspects, a network entity 506 may transmit an energy signal to one or more passive devices 502 and receive a backscatter modulated information signal from the one or more passive devices 502. To efficiently support passive devices in many use cases, e.g., asset management, logistics, warehousing and manufacturing, in some aspects, the network entity 506 may read/write information stored on the one or more passive devices 502, provide energy to the one or more passive devices 502, receive an information-bearing signal (e.g., backscatter modulated signal based on harvesting energy from a signal transmitted by the network entity 506 and reflection), and read the reflected information-bearing signal to decode information transmitted by the one or more passive devices 502.

Figure 6:
FIG. 6 is a diagram illustrating example low power wake-up radio (LP-WUR) receiver and main radio (MR).

FIG. 6 is a diagram 600 illustrating example low power wake-up radio (LP-WUR) receiver and main radio (MR). The LP-WUR 604 is a companion receiver monitoring wake up signal (WUS) with very low power while MR 606 is in deep sleep state. The LP-WUR 604 may wake up main radio when data communication may occur. For example, the LP-WUR 604 may monitor for WUS at time occasion 662. Based on not receiving a WUS, the MR 606 may not wake up at time occasion 652. The LP-WUR 604 may monitor for WUS at time occasion 664. Based on receiving a WUS, the MR 606 may wake up at time occasion 654. The LP-WUR 604 may consume low power and may be powered separately from the MR 606. The LP-WUR 604 may not be used for bidirectional communication with a network entity (such as a base station), and may be used for monitoring paging information so that MR 606 may be woke up for communication.

In some aspects, to further reduce energy consumed, by way of example, transition energy for waking up MR, in some aspects, backscattering radio (BR) may be used instead of LP-WUR.

Figure 7:
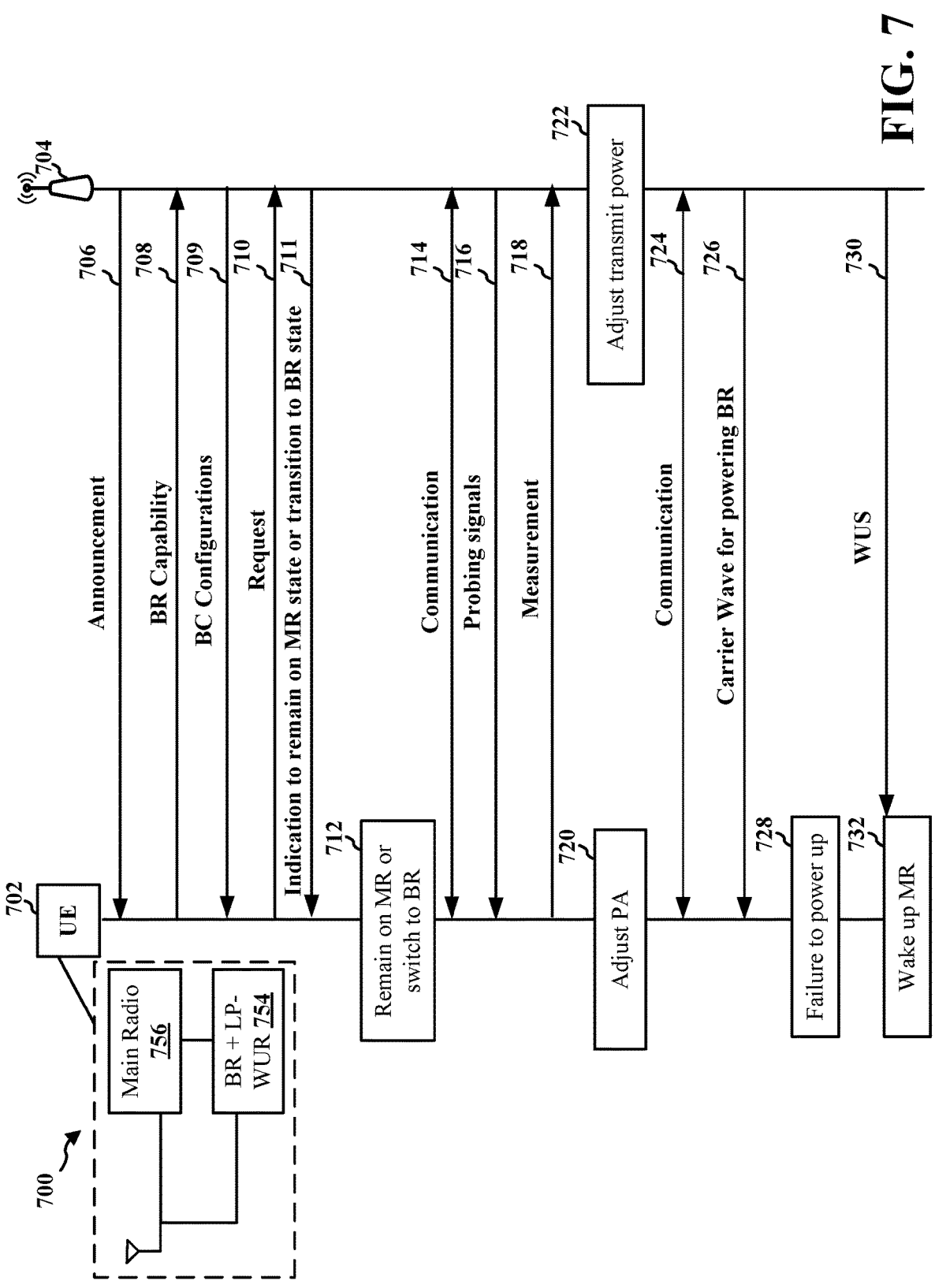
FIG. 7 is a diagram illustrating example communications between a network entity and a UE.

FIG. 7 is a diagram 700 illustrating example communications between a network entity 704 and a UE 702. In some aspects, the network entity 704 may be referred to as a network node. In some aspects, the network node may be implemented as an aggregated base station, a component of a disaggregated base station, an integrated access and backhaul (IAB) node, a relay node, a sidelink node, or the like. In some aspects, the network entity 704 may be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC.

In some aspects, the UE 702 may include a MR 756 and a BR 754 with LP-WUR. In some aspects, the BR 754 may be used to receive and transmit data. In some aspects, the BR 754 with LP-WUR may be ultra-low power with passive components for both receiving and transmitting, enabling longer sleep time for MR. In some aspects, the state of the UE 702 where the MR 756 is asleep (and the MR 756 is not transmitting or receiving data) may be referred to as a "BR state." In some aspects, the state of the UE 702 where the MR 756 is awake (for transmitting or receiving data) may be referred to as a "MR state." By using the BR 754, low data-rate communication using the BR 754 may be possible, enabling lower latency for low data-rate data transmissions (as waking up MR 756 for low data-rate data transmissions may take time). The BR 754 with the LP-WUR may wake up MR 756 under different circumstances based on aspects described herein.

In some aspects, the BR 754 may include a transceiver with envelope detection-based reception. In some aspects, the transceiver may be without LNA low noise amplifier and may use power amplifier (PA). In some aspects, the transceiver may use load modulation based transmission, e.g., absorbing or reflecting incoming EM waves (which may be otherwise referred to as "carrier wave"). In some aspects, the transceiver included as part of the BR 754 may be associated with integrated circuit (IC) support for processing UL and DL data (e.g., reading memory, computing cyclic redundancy check (CRC), waking up MR or stay in BR, or the like). In some aspects, the BR 754 may be equipped with power harvesting circuitry enabling wireless power harvesting and charging the battery in idle mode.

As illustrated in FIG. 7, the UE 702 may report BR capability 708 to the network entity 704. The term "BR capability" may refer to a capability associated with using a BR instead of a MR for communication with a base station (such as receive/transmit). In some aspects, the network entity 704 may announce (e.g., in MIB/SIB) support or not support of backscatter communication (BC) in announcement 706; one or more bits in MIB/SIB may indicate the cell's support of BC. In some aspects, the BR capability 708 may be reported based on the announcement 706 indicating support of the network entity 704's support of BC. In some aspects, BC configurations 709 may be transmitted to the UE 702 using broadcast or dedicated signaling, e.g., BC-BWP. In some aspects, the BC configurations 709 may be transmitted to the UE 702 based on receiving the BR capability 708. In some aspects, the UE 702 may transmit a request 710 requesting transition to a BR state. For example, the UE 702 may determine deep sleep opportunities based on traffic arrival (e.g., downlink traffic pattern), battery state, or the like, and transmit the request 710 accordingly. In some aspects, the request 710 may be a message request transitioning to BR state for power saving. In some aspects, the request 710 may also indicate UE 702's recommendation of minimum BR duration, transition time to wake up MR, or the like.

In some aspects, the network entity 704 may transmit an indication 711 indicating go to sleep (transition to BR state) or remain on MR to the UE 702. The UE 702 may transition to BR state (e.g., putting the MR 756 to a sleep state) accordingly or remain on MR 756 (the MR 756 remain active) at 712. In some aspects, the indication 711 may be transmitted in response to the request 710. In some aspects, the network entity 704 may determine that the UE 702 may transition to BR state based on UE 702's request 710 (e.g., and associated downlink traffic pattern, battery state, or the like) and transmit the indication 711 indicating go to sleep (transition to BR state) accordingly. In some aspects, the network entity 704 may configure (e.g., as part of the indication 711) monitoring occasions for the UE 702 (e.g., such as the BR 754) to monitor for paging signals or WUS so that the UE 702 may wake up the MR 756 based on signaling from the network entity 704. In some aspects, network entity 704 may configure (e.g., as part of the indication 711) UL trigger occasions for the UE 702 to transmit a radio transition signal indicating the UE 702 wants to wake up MR 756 based on UL traffic that may not be transmitted efficiently using the BR 754 (e.g., UL packet size exceeding a threshold).

In some aspects, the indication 711 indicating go to sleep (transition to BR state) may be transmitted by the network entity 704 without receiving a request 710 based on load of a cell and capability of one or more UEs in an area associated with the network entity 704. In some aspects, the network entity 704 may receive a response from the UE 702 indicating whether the UE 702 may transition to the BR state (e.g., determined based on UL buffer at the UE 702 which may represent UL packets to be transmitted by the UE 702). If the UL buffer at the UE 702 is larger than a threshold, the UE 702 may respond with not transitioning to the BR state. If the UL buffer at the UE 702 is smaller than a threshold, the UE 702 may respond with transitioning to the BR state.

In some aspects, after the UE 702 remain on the MR state or transition to the BR state at 712, the UE 702 and the network entity 704 may exchange communications 714. In some aspects, if the UE 702 remains on the MR state, the UE

702 may be using the BR 754 to exchange the communications 714. For example, the UE 702 may backscatter waveforms (which may be otherwise referred to as "carrier waves") transmitted by the network entity 704 by absorbing/reflecting indicating bits in the carrier waves. In some aspects, communications based on BR 754 may have a smaller range than communications based on the MR 756.

In some aspects, the BR 754 may be powered by the network entity 704. For example, the BR 754 may be passive and the UE 702 may indicate to the network entity 704 that the BR 754 may be operating based on the network entity 704's transmitting energy (e.g., energy in the carrier waves) without other power source. In some aspects, the network entity 704 may transmit one or more probing signals 716. In some aspects, the one or more probing signals 716 may be transmitted before the UE 702 transition to the BR state (putting the MR 756 to a sleep state). In some aspects, the one or more probing signals 716 may be transmitted after the UE 702 transition to the BR state (putting the MR 756 to a sleep state). In some aspects, the term "probing signals" may refer to signals, such as pulse signals, transmitted by a network entity for checking operations associated with a BR on a UE. The probing signals may be a beamformed continuous "carrier wave" providing energy to one UE or a group of UEs. The UE may provide feedback so that the network entity may choose a transmit beam based on the feedback; the probing signals may be a power-optimized waveform where the energy signals are transmitted at favorable frequencies, power level and shape (e.g., pulse with high peak or continuous wave); similarly, the power-optimized waveform may be selected based on UE feedback.

In some aspects, upon receiving the one or more probing signals 716, the UE 702 may provide feedback, such as measurement 718, to the network entity 704. The measurement 718 may represent BR measurement and may represent if coverage from the network entity 704 (based on transmit energy associated with the one or more probing signals 716) may be sufficient for the UE 702 to operate in the BR state (using the BR 754). In some aspects, the network entity 704 may adjust (such as increase) transmit power or adjust pre-coding/beam (e.g., at 722) for transmitting carrier waves to the BR 754 based on the measurement 718. In some aspects, after adjusting transmit power or adjusting pre-coding/beam (e.g., at 722), the UE 702 and the network entity 704 may further exchange communication 724.

In some aspects, the UE 702 or the network entity 704 may determine if the BR 754 powered by the network entity 704 is sufficient, e.g., UE-side measurement 718 using BR exceeds an input power threshold (which may be determined by the network entity 704 based on UE-BR sensitivity plus a shadowing margin) may represent that the BR 754 powered by the network entity 704 is sufficient. In some aspects, the UE-side measurement 718 using BR not exceeding an input power threshold (which may be determined by the network entity 704 based on UE-BR sensitivity plus a shadowing margin) may represent that the BR 754 powered by the network entity 704 is not sufficient. In some aspects, the UE 702 may be further configured with (such as by the network entity 704 in indication 711 or a separate signaling) periodic occasions to wake up the MR 756 if the BR 754 cannot be powered by the network entity 704. In some aspects, the network entity 704 may power up the BR 754 on one or more time occasions (which may be referred to as "check BR" occasions) by transmitting carrier wave 726. In some aspects, the one or more time occasions (and the time for transmitting the carrier wave 726) may be before a wake up MR (associated with waking up the MR 756) occasions by T1, where T1 may be a time and may be based on the time take to wake up the MR 756. In some aspects, if the BR 754 cannot be powered up by the carrier wave 726 at 728, the UE 702 may wake up the MR 756 at 732 (and switch to the MR state).

Figures 8A, 8B:
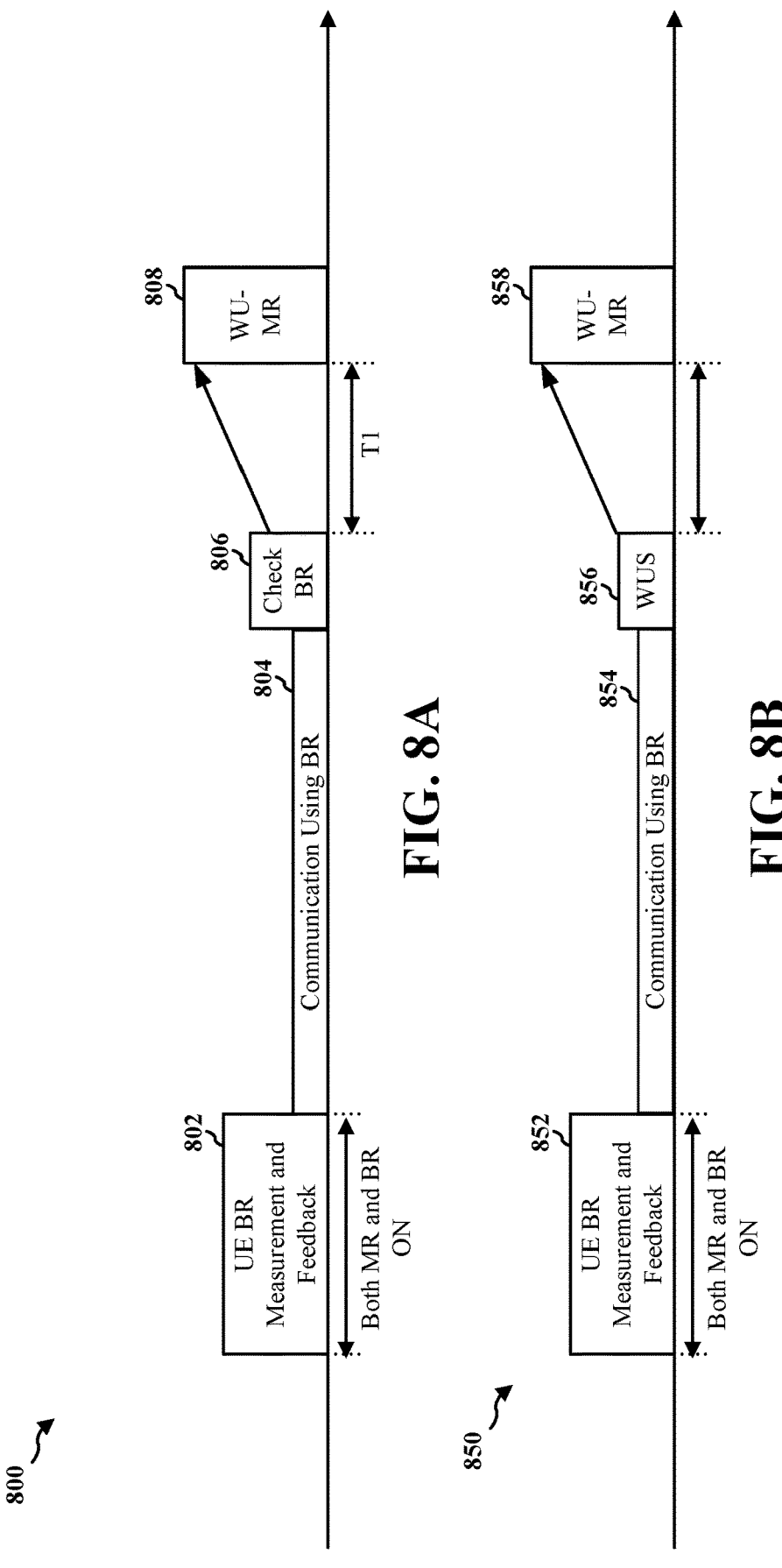
FIG. 8A is a diagram illustrating example communications using BR and waking up MR.
FIG. 8B is a diagram illustrating example communications using BR and waking up MR.

FIG. 8A is a diagram 800 illustrating example communications using BR and waking up MR. As illustrated in FIG. 8A, the UE 702 may perform BR measurement and provide feedback at 802 (which may correspond to receiving probing signal 716 and transmitting measurement 718). In some aspects, the UE 702 may also communicate with the network entity 704 at 804 (which may correspond to communication 724). In some aspects, at a check BR occasion 806 (which may correspond to receiving the carrier wave 726), the UE 702 may determine that the BR 754 failed to be powered and accordingly wake up at WU-MR occasion 808, which may be T1 after the check BR occasion 806.

In some aspects, the BR 754 may be powered by a battery at the UE 702. For example, the BR 754 may be semi-passive and the UE 702 may indicate to the network entity 704 that the BR 754 may be operating based on the network entity 704's transmitting energy (e.g., energy in the carrier waves) and the battery. In some aspects, the network entity 704 may transmit one or more probing signals 716. In some aspects, the one or more probing signals 716 may be transmitted before the UE 702 transition to the BR state (putting the MR 756 to a sleep state). In some aspects, the one or more probing signals 716 may be transmitted after the UE 702 transition to the BR state (putting the MR 756 to a sleep state).

In some aspects, upon receiving the one or more probing signals 716, the UE 702 may provide feedback, such as measurement 718, to the network entity 704. The measurement 718 may represent BR measurement and may represent if coverage from the network entity 704 (based on transmit energy associated with the one or more probing signals 716) may be adequate for the UE 702 to operate in the BR state (using the BR 754 that may be semi-passive and powered by both the battery and carrier wave energy). In some aspects, the network entity 704 may adjust (such as increase) transmit power or adjust pre-coding/beam (e.g., at 722) for transmitting carrier waves to the BR 754 based on the measurement 718. In some aspects, after adjusting transmit power or adjusting pre-coding/beam (e.g., at 722), the UE 702 and the network entity 704 may further exchange communication 724. In some aspects, the UE 702 may also adjust PA at 720 based on the measurement 718 to adjust the BC. In some aspects, information may be transmitted to the UE 702 or transmitted by the UE 702 using the BR 754. In some aspects, the data size may be small, such as lower than 1,000 bits. In some aspects, the UE 702 may have CRC without forward error correction (FEC) for BC using the BR 754 while the MR 756 is asleep.

In some aspects, if the network entity 704 may page the UE 702, the network entity 704 may transmit WUS 730 to the UE 702. For example, the WUS 730 may be based on information associated with a buffer at the network entity 704 that may buffer data for the UE 702. For example, the WUS 730 may be transmitted if the data is associated with a voice call, associated with a payload size higher than a threshold, or associated with high reliability low latency specification. Upon receiving the WUS 730, the UE 702 may wake up the MR 756 accordingly at 732.

FIG. 8B is a diagram 850 illustrating example communications using BR and waking up MR. As illustrated in FIG. 8B, the UE 702 may perform BR measurement and provide feedback at 852 (which may correspond to receiving probing signal 716 and transmitting measurement 718). In some aspects, the UE 702 may also communicate with the network entity 704 at 854 (which may correspond to communication 724). In some aspects, upon receiving WUS 856 (which may correspond to the WUS 730), the UE 702 may wake up at WU-MR occasion 858.

FIG. 9 is a flowchart 900 of a method of wireless communication. The method may be performed by a UE (e.g., the UE 104, the UE 702; the apparatus 1304).

At 902, the UE may transmit an indication of a BR capability to a network entity. For example, the UE 702 may transmit an indication of a BR capability (e.g., 706) to a network entity 704. In some aspects, 902 may be performed by the BC component 198.

At 904, the UE may receive a first message from the network entity, the first message indicating that the UE is to remain on a MR state or transition to a BR state. For example, the UE 702 may receive a first message from (e.g., 711) the network entity 704, the first message indicating that the UE is to remain on a MR state or transition to a BR state. In some aspects, 904 may be performed by the BC component 198.

FIG. 10 is a flowchart 1000 of a method of wireless communication. The method may be performed by a UE (e.g., the UE 104, the UE 702; the apparatus 1304).

In some aspects, at 1001, the UE may receive an announcement indicating a support of BC from the network entity, where the indication of the BR capability is transmitted based on the announcement. For example, the UE 702 may receive an announcement 706 indicating a support of BC from the network entity 704, where the indication of the BR capability is transmitted based on the announcement. In some aspects, 1001 may be performed by the BC component 198.

At 1002, the UE may transmit an indication of a BR capability to a network entity. For example, the UE 702 may transmit an indication of a BR capability (e.g., 706) to a network entity 704. In some aspects, 1002 may be performed by the BC component 198.

At 1003, the UE may transmit a second message to the network entity, where the second message may indicate a request to transition to the BR state from the MR state. For example, the UE 702 may transmit a second message to the network entity, where the second message may indicate a request 710 to transition to the BR state from the MR state. In some aspects, 1003 may be performed by the BC component 198.

At 1004, the UE may receive a first message from the network entity, the first message indicating that the UE is to remain on a MR state or transition to a BR state. For example, the UE 702 may receive a first message from (e.g., 711) the network entity 704, the first message indicating that the UE is to remain on a MR state or transition to a BR state. In some aspects, 1004 may be performed by the BC component 198. In some aspects, the first message may be based on the second message and a downlink traffic pattern associated with the UE. In some aspects, the first message may be received before the second message is transmitted. In some aspects, the second message may be transmitted before the first message is received. In some aspects, the second message may indicate a minimum duration associated with the BR state or a transition time to wake up. In some aspects, the second message may be based on at least one of a traffic arrival or a battery state.

At 1006, the UE may remain on the MR state or transition to the BR state based on the first message. For example, the UE 702 may remain on the MR state or transition to the BR state (e.g., at 712) based on the first message. In some aspects, 1006 may be performed by the BC component 198.

At 1007, the UE may receive a third message from the network entity, where the third message indicates that the UE is to transition to the BR state from the MR state. For example, the UE 702 may receive a third message (such as the WUS 730) from the network entity, where the third message indicates that the UE is to transition to the BR state from the MR state. In some aspects, 1007 may be performed by the BC component 198.

At 1008, the UE may communicate with the network entity based on remaining on the MR state or transitioning to the BR state, where the communication with the network entity may be based on the received first message. For example, the UE 702 may communicate (e.g., 714 or 724) with the network entity 704 based on remaining on the MR state or transitioning to the BR state, where the communication with the network entity is based on the received first message. In some aspects, 1008 may be performed by the BC component 198. In some aspects, the communication is based on transitioning to the BR state, where the BR state is based on a passive BR and powered by a first carrier wave associated with the network entity, and the UE may receive one or more probing signals 716 from the network entity 704 before transitioning to the BR state and transmit a measurement 718 associated with the one or more probing signals before transitioning to the BR state or after transitioning to the BR state.

In some aspects, at 1032, the UE may receive a second carrier wave for powering the passive BR at a first time occasion before a second time occasion, where the second time occasion is configured for transitioning back to the MR state. For example, the UE 702 may receive a second carrier wave (e.g., 726) for powering the passive BR at a first time occasion (e.g., 806) before a second time occasion (e.g., 808), where the second time occasion may be configured for transitioning back to the MR state. In some aspects, 1032 may be performed by the BC component 198.

In some aspects, at 1034, the UE may transition back to the MR state based on failing to power the passive BR from the second carrier wave. For example, the UE 702 may transition back to the MR state (e.g., at 732) based on failing to power the passive BR (e.g., at 728) from the second carrier wave. In some aspects, 1034 may be performed by the BC component 198.

In some aspects, the communication may be based on transitioning to the BR state, where the BR state is based on a semi-passive BR and powered by a battery associated with the UE. At 1012, the UE may receive one or more probing signals from the network entity before transitioning to the BR state. For example, the UE 702 may receive one or more probing signals 716 from the network entity 704 before transitioning to the BR state. In some aspects, 1012 may be performed by the BC component 198.

At 1014, the UE may transmit a measurement associated with the one or more probing signals before transitioning to the BR state or after transitioning to the BR state. For example, the UE 702 may transmit a measurement 718 associated with the one or more probing signals before transitioning to the BR state or after transitioning to the BR state. In some aspects, 1014 may be performed by the BC component 198.

At 1020, the UE may adjust a power amplifier (PA) associated with the UE based on the measurement. For example, the UE 702 may adjust a PA (e.g., at 720) associated with the UE 702 based on the measurement 718. In some aspects, 1020 may be performed by the BC component 198.

At 1022, the UE may receive a WUS from the network entity, where the WUS indicates a transition back to the MR state. For example, the UE 702 may receive a WUS 730 from the network entity 704, where the WUS may indicate a transition back to the MR state (e.g., at 732). In some aspects, 1022 may be performed by the BC component 198.

FIG. 11 is a flowchart 1100 of a method of wireless communication. The method may be performed by a network entity (e.g., the base station 102, the network entity 704, the network entity 1302, the network entity 1402).

At 1102, the network entity may receive an indication of a BR capability associated with a UE. For example, the network entity 704 may receive an indication of a BR capability (e.g., 708) associated with a UE 702. In some aspects, 1102 may be performed by the BC component 199.

At 1104, the network entity may transmit a first message to the UE, the first message indicating that the UE is to remain on a MR state or transition to a BR state. For example, the network entity 704 may transmit a first message (e.g., 711) to the UE 702, the first message indicating that the UE is to remain on a MR state or transition to a BR state. In some aspects, 1104 may be performed by the BC component 199.

Figure 12:
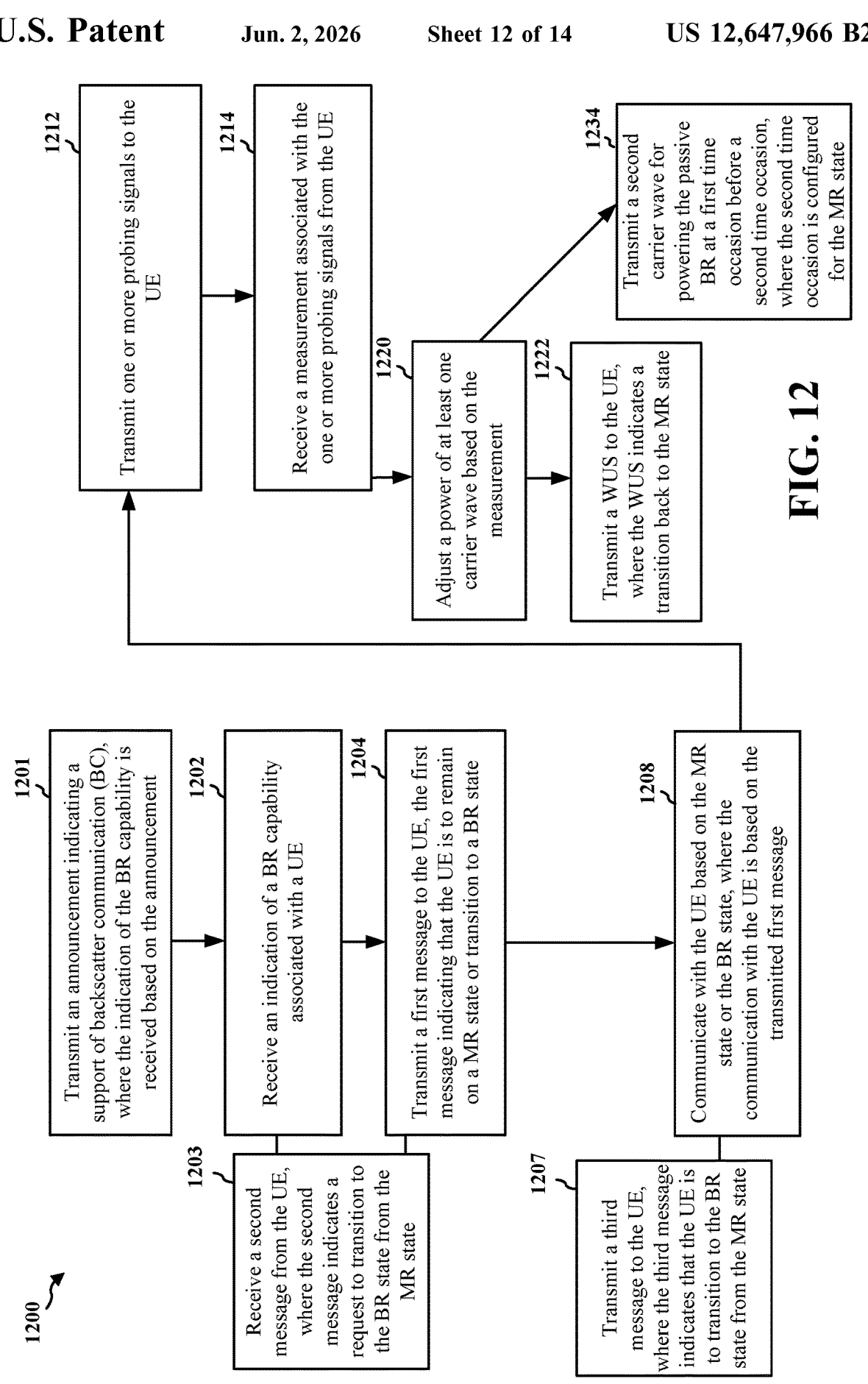
FIG. 12 is a flowchart of a method of wireless communication.

FIG. 12 is a flowchart 1200 of a method of wireless communication. The method may be performed by a network entity (e.g., the base station 102, the network entity 704, the network entity 1302, the network entity 1402).

At 1201, the network entity may transmit an announcement indicating a support of backscatter communication (BC), where the indication of the BR capability is received based on the announcement. For example, the network entity 704 may transmit an announcement 706 indicating a support of backscatter communication (BC), where the indication of the BR capability is received based on the announcement. In some aspects, 1201 may be performed by the BC component 199.

At 1202, the network entity may receive an indication of a BR capability associated with a UE. For example, the network entity 704 may receive an indication of a BR capability (e.g., 708) associated with a UE 702. In some aspects, 1202 may be performed by the BC component 199.

At 1203, the network entity may receive a second message from the UE, where the second message indicates a request to transition to the BR state from the MR state. For example, the network entity 704 may receive a second message from the UE, where the second message indicates a request 710 to transition to the BR state from the MR state. In some aspects, 1203 may be performed by the BC component 199.

At 1204, the network entity may transmit a first message to the UE, the first message indicating that the UE is to remain on a MR state or transition to a BR state. For example, the network entity 704 may transmit a first message (e.g., 711) to the UE 702, the first message indicating that the UE is to remain on a MR state or transition to a BR state. In some aspects, 1204 may be performed by the BC component 199. In some aspects, the first message may be based on the second message and a downlink traffic pattern associated with the UE. In some aspects, the first message may be transmitted before the second message is received. In some aspects, the second message may be received before the first message is transmitted. In some aspects, the second message may further indicate a minimum duration associated with the BR state or a transition time to wake up. In some aspects, the second message may be based on at least one of a traffic arrival or a battery state.

At 1207, the network entity may transmit a third message to the UE, where the third message indicates that the UE is to transition to the BR state from the MR state. For example, the network entity 704 may transmit a third message (e.g., WUS 730) to the UE 702, where the third message indicates that the UE is to transition to the BR state from the MR state. In some aspects, 1207 may be performed by the BC component 199.

At 1208, the network entity may communicate with the UE based on the MR state or the BR state, where the communication with the UE is based on the transmitted first message. For example, the network entity 704 may communicate (e.g., 714 or 724) with the UE 702 based on the MR state or the BR state, where the communication with the UE is based on the transmitted first message. In some aspects, 1208 may be performed by the BC component 199. In some aspects, the communication may be based on the BR state, where the BR state may be based on a passive BR and powered by a first carrier wave associated with the network entity. At 1212, the network entity may transmit one or more probing signals to the UE. For example, the network entity 704 may transmit one or more probing signals 716 to the UE 702. In some aspects, 1212 may be performed by the BC component 199. At 1214, the network entity may receive a measurement associated with the one or more probing signals from the UE. For example, the network entity 704 may receive a measurement 718 associated with the one or more probing signals 716 from the UE 702. In some aspects, 1214 may be performed by the BC component 199. At 1220, the network entity may adjust a power of the first carrier wave based on the measurement. For example, the network entity 704 may adjust a power (e.g., at 722) of the first carrier wave based on the measurement. In some aspects, 1220 may be performed by the BC component 199.

In some aspects, at 1234, the network entity may transmit a second carrier wave for powering the passive BR at a first time occasion before a second time occasion, where the second time occasion is configured for the MR state. For example, the network entity 704 may transmit a second carrier wave (e.g., 726) for powering the passive BR at a first time occasion before a second time occasion, where the second time occasion is configured for the MR state. In some aspects, 1234 may be performed by the BC component 199.

In some aspects, the communication may be based on the BR state, where the BR state may be based on a semi-passive BR and powered by a battery associated with the UE. At 1212, the network entity may transmit one or more probing signals to the UE. For example, the network entity 704 may transmit one or more probing signals 716 to the UE 702. In some aspects, 1212 may be performed by the BC component 199. At 1214, the network entity may receive a measurement associated with the one or more probing signals from the UE. For example, the network entity 704 may receive a measurement 718 associated with the one or more probing signals 716 from the UE 702. In some aspects, 1214 may be performed by the BC component 199. At 1220, the network entity may adjust a power of the first carrier wave based on the measurement. For example, the network entity 704 may adjust a power (e.g., at 722) of the first carrier wave based on the measurement. In some aspects, 1220 may be performed by the BC component 199.

At 1222, the network entity may transmit a wake-up signal (WUS) to the UE, where the WUS may indicate a transition back to the MR state. For example, the network entity 704 may transmit a WUS 730 to the UE 702, where the WUS indicates a transition back to the MR state. In some aspects, 1222 may be performed by the BC component 199.

Figure 13:
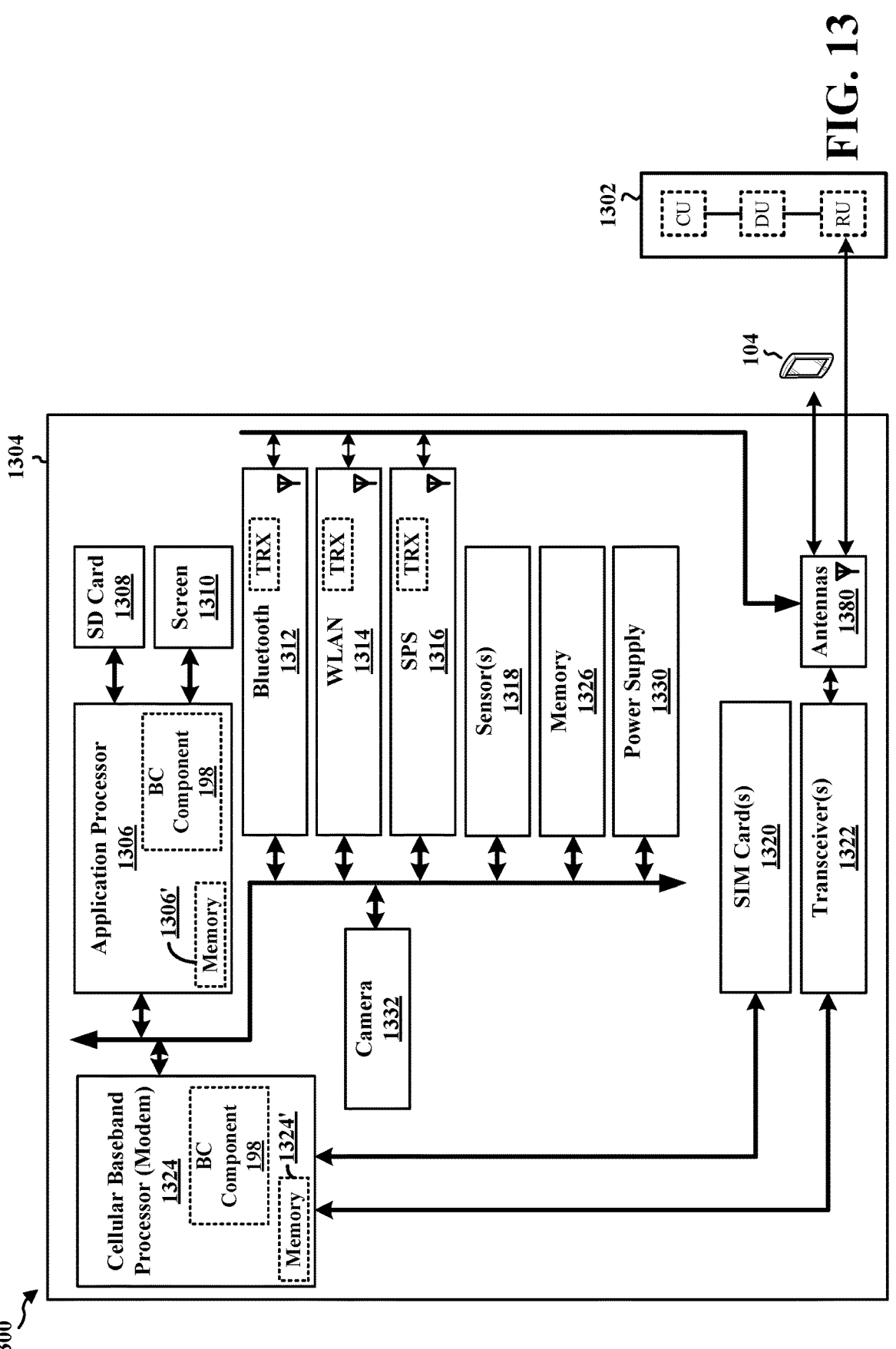
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, a satellite system module 1316 (e.g., GNSS module), one or more sensor modules 1318 (e.g., barometric pressure sensor/altimeter; motion sensor such as inertial management unit (IMU), gyroscope, and/or accelerometer(s); light detection and ranging (LI-DAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the satellite system module 1316 may include an on-chip transceiver (TRX)/receiver (RX). The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described herein. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see 350 of FIG. 3) and include the additional modules of the apparatus 1304.

As discussed herein, in some aspects, the BC component 198 may be configured to transmit an indication of a backscattering radio (BR) capability to a network entity. In some aspects, the BC component 198 may be further configured to receive a first message from the network entity, the first message indicating that the UE is to remain on a main radio (MR) state or transition to a BR state. The BC component 198 may be within the cellular baseband processor 1324, the application processor 1306, or both the cellular baseband processor 1324 and the application processor 1306. The BC component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, includes means for transmitting an indication of a BR capability to a network entity. In some aspects, the apparatus 1304 may further include means for receiving a first message from the network entity, the first message indicating that the UE is to remain on a MR state or transition to a BR state. In some aspects, the apparatus 1304 may further include means for receiving an announcement indicating a support of backscatter communication (BC) from the network entity, where the indication of the BR capability is transmitted based on the announcement. In some aspects, the apparatus 1304 may further include means for remaining on the MR state or transition to the BR state based on the first message. In some aspects, the apparatus 1304 may further include means for communicating with the network entity based on remaining on the MR state or transitioning to the BR state, where the communication with the network entity is based on the received first message. In some aspects, the apparatus 1304 may further include means for receiving one or more probing signals from the network entity before transitioning to the BR state. In some aspects, the apparatus 1304 may further include means for transmitting a measurement associated with the one or more probing signals before transitioning to the BR state or after transitioning to the BR state. In some aspects, the apparatus 1304 may further include means for receiving a second carrier wave for powering the passive BR at a first time occasion before a second time occasion, where the second time occasion is configured for transitioning back to the MR state. In some aspects, the apparatus 1304 may further include means for transitioning back to the MR state based on failing to power the passive BR from the second carrier wave. In some aspects, the apparatus 1304 may further include means for receiving one or more probing signals from the network entity before transitioning to the BR state. In some aspects, the apparatus 1304 may further include means for transmitting a measurement associated with the one or more probing signals before transitioning to the BR state or after transitioning to the BR state. In some aspects, the apparatus 1304 may further include means for adjusting a power amplifier (PA) associated with the UE based on the measurement. In some aspects, the apparatus 1304 may further include means for receiving a wake-up signal (WUS) from the network entity, where the WUS indicates a transition back to the MR state. In some aspects, the apparatus 1304 may further include means for transmitting a second message to the network entity, where the second message indicates a request to transition to the BR state from the MR state. In some aspects, the apparatus 1304 may further include means for receiving a third message from the network entity, where the third message indicates that the UE is to transition to the BR state from the MR state. The means may be the BC component 198 of the apparatus 1304 configured to perform the functions recited by the means. As described herein, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
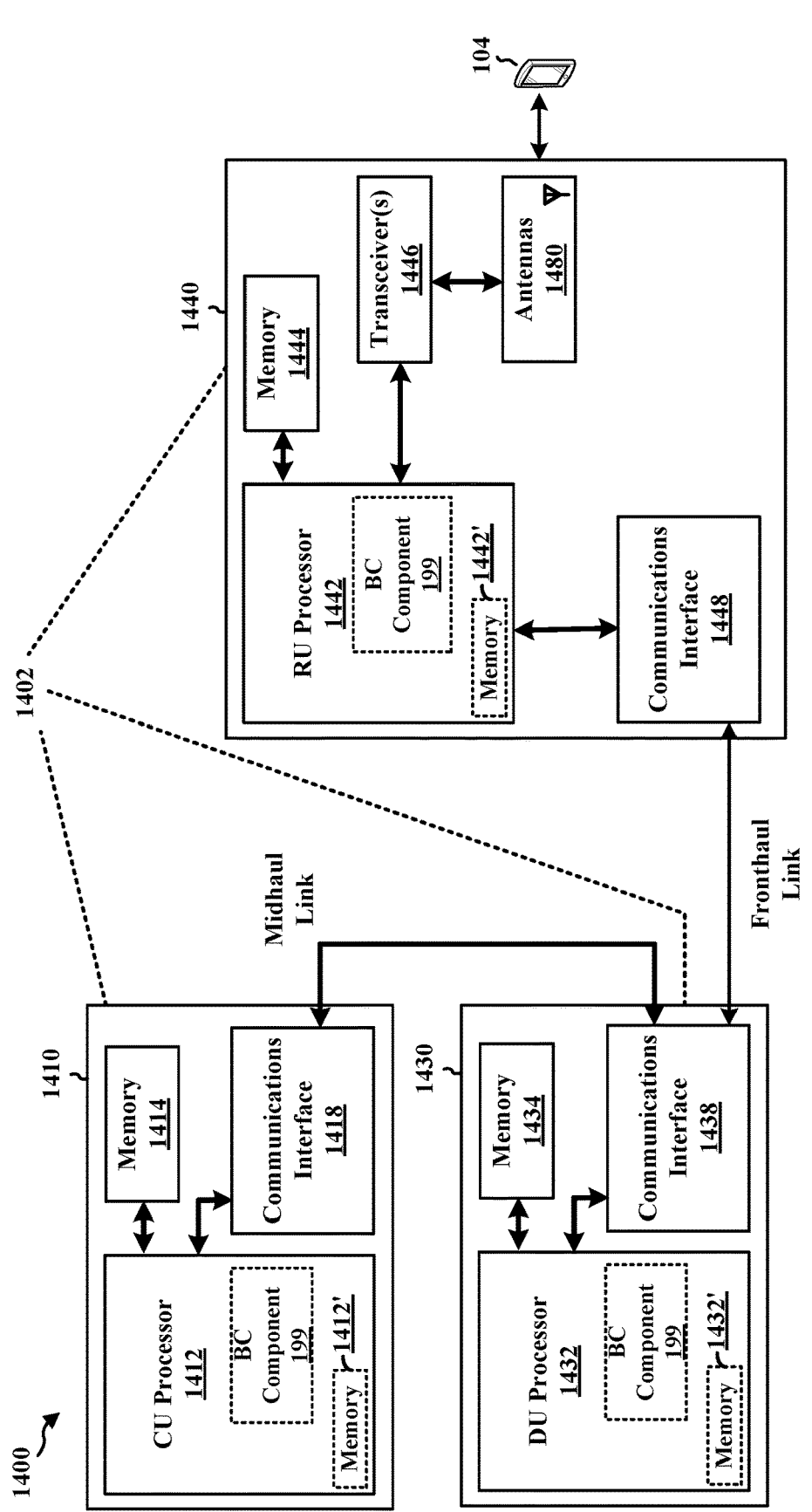
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described herein. The computer-readable medium/memory may also be used for storing data that is manipulated by the processor(s) when executing software.

As discussed herein, in some aspects, the BC component 199 may be configured to receive an indication of a BR capability associated with a UE. In some aspects, the BC component 199 may be further configured to transmit a first message to the UE, the first message indicating that the UE is to remain on a MR state or transition to a BR state. The BC component 199 may be within one or more processors of one or more of the CU 1410, DU 1430, and the RU 1440. The BC component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 includes means for receiving an indication of a BR capability associated with a UE. In some aspects, the network entity 1402 may further include means for transmitting a first message to the UE, the first message indicating that the UE is to remain on a MR state or transition to a BR state. In some aspects, the network entity 1402 may further include means for transmitting an announcement indicating a support of backscatter communication (BC), where the indication of the BR capability is received based on the announcement. In some aspects, the network entity 1402 may further include means for communicating with the UE based on the MR state or the BR state, where the communication with the UE is based on the transmitted first message. In some aspects, the network entity 1402 may further include means for transmitting one or more probing signals to the UE. In some aspects, the network entity 1402 may further include means for receiving a measurement associated with the one or more probing signals from the UE. In some aspects, the network entity 1402 may further include means for adjusting a power of the first carrier wave based on the measurement. In some aspects, the network entity 1402 may further include means for transmitting a second carrier wave for powering the passive BR at a first time occasion before a second time occasion, where the second time occasion is configured for the MR state. In some aspects, the network entity 1402 may further include means for transmitting one or more probing signals to the UE. In some aspects, the network entity 1402 may further include means for receiving a measurement associated with the one or more probing signals from the UE. In some aspects, the network entity 1402 may further include means for adjusting a power of at least one carrier wave based on the measurement. In some aspects, the network entity 1402 may further include means for transmitting a wake-up signal (WUS) to the UE, where the WUS indicates a transition back to the MR state. In some aspects, the network entity 1402 may further include means for receiving a second message from the UE, where the second message indicates a request to transition to the BR state from the MR state. In some aspects, the network entity 1402 may further include means for transmitting a third message to the UE, where the third message indicates that the UE is to transition to the BR state from the MR state. The means may be the BC component 199 of the network entity 1402 configured to perform the functions recited by the means. As described herein, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

The following aspects are illustrative only and may be combined with other aspects or teachings described herein, without limitation.

Aspect 1 is a method for communication at a UE, including: transmitting an indication of a BR capability to a network entity; and receiving a first message from the network entity, the first message indicating that the UE is to remain on a MR state or transition to a BR state.

Aspect 2 is the method of aspect 1, further including: receiving an announcement indicating a support of backscatter communication (BC) from the network entity, where the indication of the BR capability is transmitted based on the announcement.

Aspect 3 is the method of any of aspects 1-2, further including: remaining on the MR state or transition to the BR state based on the first message; and communicating with the network entity based on remaining on the MR state or transitioning to the BR state, where the communication with the network entity is based on the received first message.

Aspect 4 is the method of any of aspects 1-3, where the communication is based on transitioning to the BR state, where the BR state is based on a passive BR and powered by a first carrier wave associated with the network entity, and further including: receiving one or more probing signals from the network entity before transitioning to the BR state; and transmitting a measurement associated with the one or more probing signals before transitioning to the BR state or after transitioning to the BR state.

Aspect 5 is the method of any of aspects 1-4, further including: receiving a second carrier wave for powering the passive BR at a first time occasion before a second time occasion, where the second time occasion is configured for transitioning back to the MR state; and transitioning back to the MR state based on failing to power the passive BR from the second carrier wave.

Aspect 6 is the method of any of aspects 1-3, where the communication is based on transitioning to the BR state, where the BR state is based on a semi-passive BR and powered by a battery associated with the UE, and further including: receiving one or more probing signals from the network entity before transitioning to the BR state; transmitting a measurement associated with the one or more probing signals before transitioning to the BR state or after transitioning to the BR state; and adjusting a power amplifier (PA) associated with the UE based on the measurement.

Aspect 7 is the method of any of aspects 1-3 and 6, further including: receiving a wake-up signal (WUS) from the network entity, where the WUS indicates a transition back to the MR state.

Aspect 8 is the method of any of aspects 1-7, further including: transmitting a second message to the network entity, where the second message indicates a request to transition to the BR state from the MR state.

Aspect 9 is the method of any of aspects 1-8, where the first message is based on the second message and a downlink traffic pattern associated with the UE.

Aspect 10 is the method of any of aspects 1-9, where the first message is received before the second message is transmitted.

Aspect 11 is the method of any of aspects 1-9, where the second message is transmitted before the first message is received.

Aspect 12 is the method of any of aspects 1-11, where the second message further indicates a minimum duration associated with the BR state or a transition time to wake up.

Aspect 13 is the method of any of aspects 1-12, where the second message is based on at least one of a traffic arrival or a battery state.

Aspect 14 is the method of any of aspects 1-13, further including: receiving a third message from the network entity, where the third message indicates that the UE is to transition to the BR state from the MR state.

Aspect 15 is a method for communication at a network entity, including: receiving an indication of a BR capability associated with a UE; and transmitting a first message to the UE, the first message indicating that the UE is to remain on a MR state or transition to a BR state.

Aspect 16 is the method of aspect 15, further including: transmitting an announcement indicating a support of backscatter communication (BC), where the indication of the BR capability is received based on the announcement.

Aspect 17 is the method of any of aspects 15-16, further including: communicating with the UE based on the MR state or the BR state, where the communication with the UE is based on the transmitted first message.

Aspect 18 is the method of any of aspects 15-17, where the communication is based on the BR state, where the BR state is based on a passive BR and powered by a first carrier wave associated with the network entity, and further including: transmitting one or more probing signals to the UE; receiving a measurement associated with the one or more probing signals from the UE; and adjusting a power of the first carrier wave based on the measurement.

Aspect 19 is the method of any of aspects 15-18, further including: transmitting a second carrier wave for powering the passive BR at a first time occasion before a second time occasion, where the second time occasion is configured for the MR state.

Aspect 20 is the method of any of aspects 15-17, where the communication is based on the BR state, where the BR state is based on a semi-passive BR and powered by a battery associated with the UE, and further including: transmitting one or more probing signals to the UE; receiving a measurement associated with the one or more probing signals from the UE; and adjusting a power of at least one carrier wave based on the measurement.

Aspect 21 is the method of any of aspects 15-17 and 20, further including:

transmitting a wake-up signal (WUS) to the UE, where the WUS indicates a transition back to the MR state.

Aspect 22 is the method of any of aspects 15-21, further including: receiving a second message from the UE, where the second message indicates a request to transition to the BR state from the MR state.

Aspect 23 is the method of any of aspects 15-22, where the first message is based on the second message and a downlink traffic pattern associated with the UE.

Aspect 24 is the method of any of aspects 15-23, where the first message is transmitted before the second message is received.

Aspect 25 is the method of any of aspects 15-23, where the second message is received before the first message is transmitted.

Aspect 26 is the method of any of aspects 15-25, where the second message further indicates a minimum duration associated with the BR state or a transition time to wake up.

Aspect 27 is the method of any of aspects 15-26, where the second message is based on at least one of a traffic arrival or a battery state.

Aspect 28 is the method of any of aspects 15-27, further including: transmitting a third message to the UE, where the third message indicates that the UE is to transition to the BR state from the MR state.

Aspect 29 is an apparatus for wireless communication at a UE including a memory and at least one processor coupled to the memory and, based at least in part on information stored in the memory, configured to perform a method in accordance with any of aspects 1-14. The apparatus may include at least one of a transceiver or an antenna coupled to the at least one processor.

Aspect 30 is an apparatus for wireless communication, including means for performing a method in accordance with any of aspects 1-14.

Aspect 31 is a non-transitory computer-readable medium including instructions that, when executed by an apparatus, cause the apparatus to perform a method in accordance with any of aspects 1-14.

Aspect 32 is an apparatus for wireless communication at a network entity including a memory and at least one processor coupled to the memory and, based at least in part on information stored in the memory, configured to perform a method in accordance with any of aspects 15-28. The apparatus may include at least one of a transceiver or an antenna coupled to the at least one processor.

Aspect 33 is an apparatus for wireless communication, including means for performing a method in accordance with any of aspects 15-28.

Aspect 34 is a non-transitory computer-readable medium including instructions that, when executed by an apparatus, cause the apparatus to perform a method in accordance with any of aspects 15-28.

What is claimed is:

1. An apparatus for communication at a user equipment (UE), comprising:

memory; and at least one processor coupled to the memory and, based at least in part on information stored in the memory, the at least one processor is configured to:

receive, from a network entity, an announcement indicating a support of backscatter communication (BC) for the UE;

transmit, based on the announcement, an indication of a backscattering radio (BR) capability to the network entity;

receive, after transmission of the indication of the BR capability to the network entity, a BC configuration in a BC bandwidth part (BWP) dedicated for the BC communication;

transmit, after reception of the BC configuration, a request message to the network entity, wherein the request message indicates a request to transition to a BR state from a main radio (MR) state; and receive a first message from the network entity, the first message indicating that the UE is to remain on the MR state or transition to the BR state.

2. The apparatus of claim 1, wherein the at least one processor is further configured to:

remain on the MR state or transition to the BR state based on the first message; and communicate with the network entity based on remaining on the MR state or transitioning to the BR state, wherein the communication with the network entity is based on the received first message.

3. The apparatus of claim 2, wherein the communication is based on transitioning to the BR state, wherein the BR state is based on a passive BR and powered by a first carrier wave associated with the network entity, and wherein the at least one processor is further configured to:

receive one or more probing signals from the network entity before transitioning to the BR state; and transmit a measurement associated with the one or more probing signals before transitioning to the BR state or after transitioning to the BR state.

4. The apparatus of claim 3, wherein the at least one processor is further configured to:

receive a second carrier wave for powering the passive BR at a first time occasion before a second time occasion, wherein the second time occasion is configured for transitioning back to the MR state; and transition back to the MR state based on failing to power the passive BR from the second carrier wave.

5. The apparatus of claim 2, wherein the communication is based on transitioning to the BR state, wherein the BR state is based on a semi-passive BR and powered by a battery associated with the UE, and wherein the at least one processor is further configured to:

receive one or more probing signals from the network entity before transitioning to the BR state;

transmit a measurement associated with the one or more probing signals before transitioning to the BR state or after transitioning to the BR state; and adjust a power amplifier (PA) associated with the UE based on the measurement.

6. The apparatus of claim 5, wherein the at least one processor is further configured to:

receive a wake-up signal (WUS) from the network entity, wherein the WUS indicates a transition back to the MR state.

7. The apparatus of claim 1, wherein the at least one processor is further configured to:

transmit a second message to the network entity, wherein the second message indicates a request to transition to the BR state from the MR state.

8. The apparatus of claim 7, wherein the first message is based on the second message and a downlink traffic pattern associated with the UE.

9. The apparatus of claim 7, wherein to receive the first message, the at least one processor is configured to receive the first message before transmission of the second message.

10. The apparatus of claim 7, wherein to transmit the second message, the at least one processor is configured to transmit the second message before reception of the first message.

11. The apparatus of claim 7, wherein the second message further indicates a minimum duration associated with the BR state or a transition time to wake up.

12. The apparatus of claim 7, wherein the second message is based on at least one of a traffic arrival or a battery state.

13. The apparatus of claim 1, further comprising at least one of a transceiver or an antenna coupled to the at least one processor, wherein the at least one processor is further configured to:

receive a third message from the network entity, wherein the third message indicates that the UE is to transition to the BR state from the MR state.

14. The apparatus of claim 1, wherein the announcement is included in a master information block (MIB) or a system information block (SIB).

15. An apparatus for communication at a network entity, comprising:

memory; and at least one processor coupled to the memory and, based at least in part on information stored in the memory, the at least one processor is configured to:

transmit, to a user equipment (UE), an announcement indicating a support of backscatter communication (BC) for the UE;

receive, after the announcement, an indication of a backscattering radio (BR) capability associated with the UE;

transmit, after reception of the indication of the BR capability to the network entity, a BC configuration in a BC bandwidth part (BWP) dedicated for the BC communication;

receive, after transmission of the BC configuration, a request message to the network entity, wherein the request message indicates a request to transition to a BR state from a main radio (MR) state; and transmit a first message to the UE, the first message indicating that the UE is to remain on the MR state or transition to the BR state.

16. The apparatus of claim 15, wherein the at least one processor is further configured to:

communicate with the UE based on the MR state or the BR state, wherein the communication with the UE is based on the transmitted first message.

17. The apparatus of claim 16, wherein the communication is based on the BR state, wherein the BR state is based on a passive BR and powered by a first carrier wave associated with the network entity, and wherein the at least one processor is further configured to:

transmit one or more probing signals to the UE;

receive a measurement associated with the one or more probing signals from the UE; and adjust a power of the first carrier wave based on the measurement.

18. The apparatus of claim 17, wherein the at least one processor is further configured to:

transmit a second carrier wave for powering the passive BR at a first time occasion before a second time occasion, wherein the second time occasion is configured for the MR state.

19. The apparatus of claim 16, wherein the communication is based on the BR state, wherein the BR state is based on a semi-passive BR and powered by a battery associated with the UE, and wherein the at least one processor is further configured to:

transmit one or more probing signals to the UE;

receive a measurement associated with the one or more probing signals from the UE; and adjust a power of at least one carrier wave based on the measurement.

20. The apparatus of claim 19, wherein the at least one processor is further configured to:

transmit a wake-up signal (WUS) to the UE, wherein the WUS indicates a transition back to the MR state.

21. The apparatus of claim 15, wherein the at least one processor is further configured to:

receive a second message from the UE, wherein the second message indicates a request to transition to the BR state from the MR state.

22. The apparatus of claim 21, wherein the first message is based on the second message and a downlink traffic pattern associated with the UE.

23. The apparatus of claim 21, wherein to transmit the first message, the at least one processor is configured to transmit the first message before reception of the second message.

24. The apparatus of claim 21, wherein to receive the second message, the at least one processor is configured to receive the second message before transmission of the first message.

25. The apparatus of claim 21, wherein the second message further indicates a minimum duration associated with the BR state or a transition time to wake up.

26. The apparatus of claim 21, wherein the second message is based on at least one of a traffic arrival or a battery state.

27. The apparatus of claim 15, further comprising at least one of a transceiver or an antenna coupled to the at least one processor, wherein the at least one processor is further configured to:

transmit a third message to the UE, wherein the third message indicates that the UE is to transition to the BR state from the MR state.

28. A method of communication at a user equipment (UE), comprising:

receiving, from a network entity, an announcement indicating a support of backscatter communication (BC) for the UE;

transmitting, based on the announcement, an indication of a backscattering radio (BR) capability to the network entity;

receiving, after transmission of the indication of the BR capability to the network entity, a BC configuration in a BC bandwidth part (BWP) dedicated for the BC communication;

transmitting, after reception of the BC configuration, a request message to the network entity, wherein the request message indicates a request to transition to a BR state from a main radio (MR) state; and receiving a first message from the network entity, the first message indicating that the UE is to remain on the MR state or transition to the BR state.

29. A method of communication at a network entity, comprising:

transmitting, to a user equipment (UE), an announcement indicating a support of backscatter communication (BC) for the UE;

receiving, after the announcement, an indication of a backscattering radio (BR) capability associated with the UE;

transmitting, after reception of the indication of the BR capability to the network entity, a BC configuration in a BC bandwidth part (BWP) dedicated for the BC communication;

receiving, after transmission of the BC configuration, a request message to the network entity, wherein the request message indicates a request to transition to a BR state from a main radio MR) state; and transmitting a first message to the UE, the first message indicating that the UE is to remain on the MR state or transition to the BR state.

* * * * *